United States Patent [19]

Kato et al.

[11] Patent Number: 4,672,426
[45] Date of Patent: Jun. 9, 1987

[54] CHROMINANCE SIGNAL PROCESSING APPARATUS

[75] Inventors: Shiro Kato, Katano; Kiyokazu Hashimoto, Matsubara, both of Japan

[73] Assignee: Matsushita Electric Industrial Co., Ltd., Osaka, Japan

[21] Appl. No.: 722,576

[22] Filed: Apr. 12, 1985

[30] Foreign Application Priority Data

Apr. 16, 1984 [JP] Japan .................................. 59-76050

[51] Int. Cl.[4] .............................................. H04N 9/79
[52] U.S. Cl. .................................... 358/12; 358/21 R; 358/40
[58] Field of Search .................... 358/11, 12, 21 R, 30, 358/40, 320

[56] References Cited

U.S. PATENT DOCUMENTS

| 4,210,927 | 7/1980 | Yumde | 358/12 |
| 4,314,273 | 2/1982 | Amery | 358/11 |
| 4,318,120 | 3/1982 | Acampora | 358/11 |
| 4,590,510 | 5/1986 | Jensen | 358/320 |

Primary Examiner—Michael A. Masinick
Attorney, Agent, or Firm—Spencer & Frank

[57] ABSTRACT

In a chrominance signal processing apparatus for processing a sampled and digitized signal, when a first carrier chrominance signal is frequency-converted to a second carrier chrominance signal whose carrier angular frequency is a second reference angular frequency by use of a frequency converting signal, the present invention provides an arrangement such that: a variation component of a carrier signal frequency from a first reference angular frequency signal which the first carrier chrominance signal has, namely, an angular frequency difference signal is derived by an APC circuit from the first and second reference angular frequency signals, angular frequency difference signal, and further various kinds of angular frequency signals and phase signals which give necessary functions and performances as a chrominance signal processing circuit are added or subtracted in the states of the angular frequency signals and phase signals thereby simplifying the process for obtaining the above frequency converting signal; and thereby reducing the number of circuit elements and the scale in case of realizing this by a digital circuit. In addition, the invention enables the frequency variation which the first carrier chrominance signal has to be eliminated in a wide frequency range due to its performance, thereby making it possible to perform accurate frequency conversion.

11 Claims, 11 Drawing Figures

CHROMINANCE SIGNAL PROCESSING APPARATUS

BACKGROUND OF THE INVENTION

The present invention relates to a chrominance signal processing apparatus for frequency converting a carrier chrominance signal in a television signal and, more particularly, to a chrominance signal processing apparatus for use in a VTR (Video Tape Recorder) which frequency-converts a carrier chrominance signal and then records or reproduces it.

An example of a chrominance signal processing apparatus for a VTR will be explained hereinbelow.

In known VTRs, a television signal is separated into a luminance signal and a carrier chrominance signal CH (whose carrier frequency is referred to as $f_{CH}$); the luminance signal is converted to an FM signal; the carrier chrominance signal CH is frequency-converted to a carrier chrominance signal CL (whose carrier frequency is referred to as $f_{CL}$) in a frequency band (about 700 Hz) lower than that of the FM signal; and both of these FM signal and carrier chrominance signal CL are mixed and then recorded. Upon reproduction, the FM signal and carrier chrominance signal CL are separated from the reproduced signal, the FM signal is demodulated to derive the luminance signal and the carrier chrominance signal CL is frequency-converted to obtain the carrier chrominance signal CH. Then both of these luminance signal and carrier chrominance signal CH are added and thereby reproducing the television signal.

FIG. 1 shows an arrangement diagram of a conventional chrominance signal processing apparatus, in which FIG. 1(a) denotes the recording system and FIG. 1(b) represents the reproducing system. In FIG. 1(a), reference numeral 1 denotes an input terminal of the carrier chrominance signal CH; 2 is an input terminal of the horizontal sync signal separated from the luminance signal to be recorded; 3 an APC (Automatic Phase Control); 4 an AFC (Automatic Frequency Control); 5 and 6 frequency converters; 7 an output terminal of the carrier chrominance signal CL; 8 an input terminal of the reproduced carrier chrominance signal CL; 9 an input terminal of the horizontal sync signal separated from the reproduced luminance signal; 10 a frequency converter; 11 an APC; and 12 an output terminal of the reproduced carrier chrominance signal CH.

The operation of the conventional chrominance signal processing apparatus constituted as described above will be described hereinbelow.

Upon recording, the APC 3 is one kind of PLL (Phase Locked Loop) and outputs an amplitude signal of the frequency $f_{CH}$ whose phase is synchronized with the burst of the carrier chrominance signal CH which is inputted from the terminal 1. The AFC 4 is one kind of PLL and outputs an amplitude signal of the frequency $k \cdot f_H = f_{CL}$ ($f_{CL}$ is defined by this equation and k is a constant value which is represented by an integer ratio, for instance, $k = 43\frac{3}{4}$ in the $\frac{3}{4}$ inch cassette VTR) which is proportional to the frequency $f_H$ of the horizontal sync signal that is inputted from the terminal 2. The frequency converter 5 receives two amplitude signals of the frequencies $f_{CH}$ and $f_{CL}$ from the APC 3 and AFC 4 and outputs an amplitude signal of the frequency of $(f_{CH} + f_{CL})$ or $(f_{CH} - f_{CL})$, namely, a frequency converting signal. The frequency converter 6 frequency-converts the carrier frequency of the carrier chrominance signal CH from the terminal 1 from $f_{CH}$ to $f_{CL}$ by means of the frequency converting signal thereby obtaining the carrier chrominance signal CL. This signal is outputted from the terminal 7. In the case of performing the duplication of video tapes or the like by way of the APC and AFC as well, the carrier frequency $f_{CL}$ of the converted carrier chrominance signal is accurately set to $k \cdot f_H$.

The reproducing operation will now be described. Since the reproduced signal has a time base variation, the frequency of the horizontal sync signal which is inputted from the terminal 9 has $(f_H + \Delta f_H)$, i.e., variation component of $\Delta f_H$; thus the AFC 4 outputs an amplitude signal of the frequency of $k(f_H + \Delta f_H)$ in keeping with a change in frequency of the horizontal sync signal. The frequency converter 5 receives the amplitude signal of the frequency $f_{CH}$ from the APC 11 and the amplitude signal from the AFC 4 and then outputs an amplitude signal of the frequency of $(k(f_H + \Delta f_H) + f_{CH})$, namely, a frequency converting signal. Since the carrier chrominance signal CL which is inputted from the terminal 8 also has a time base variation, the carrier frequency can be represented by $(f_{CL} + \Delta f_{CL})$. In this case, $(\Delta f_H / f_H) = (\Delta f_{CL} / f_{CL})$ is satisfied due to a property of the time base variation and $f_{CL} = k \cdot f_H$, so that the frequency of the frequency converting signal becomes $(f_{CH} + f_{CL} + \Delta f_{CL})$. Therefore, the frequency converter 10 derives the carrier chrominance signal CH of the frequency $f_{CH}$ by eliminating the frequency variation component from the carrier frequency $(f_{CL} + \Delta f_{CL})$ of the carrier chrominance signal CL from the terminal 8 by the frequency converting signal and then outputs this carrier chrominance signal CH from the terminal 12. The APC 11 compares the phase of the amplitude signal of the fixed frequency $f_{CH}$ provided therein with the phase of the burst signal in the carrier chrominance signal CH from the frequency converter 10 and operates to reduce the residual phase difference of the carrier chrominance signal.

As described above, the conventional chrominance signal processing apparatus obtains the amplitude signal of the frequency of nearly $(f_{CH} + f_{CL})$ or $(f_{CH} - f_{CL})$, i.e., the frequency converting signal by the frequency converter 5 which receives the amplitude signal of the frequency $f_{CH}$ and amplitude signal of the frequency $f_{CL}$.

However, two frequency converters each having a filter therein that are difficult to be constituted as an IC (integrated circuit) are needed, and the arrangement is complicated. Therefore, there is a problem such that a further miniaturization of the apparatus and a reduction in cost are difficult to obtain. On the other hand, there is a method whereby the miniaturization of the apparatus and the reduction in cost are realized by use of a digital signal processing technology which need not use parts such as capacitors, inductors or the like which cannot be constituted in an IC and which simplify integration for producing an IC. However, even by means of the digital signal processing technology, its filter needs a number of multipliers and adders each having a large circuit scale except for special cases; consequently, there is also a problem such that a production of such an IC becomes difficult in terms of the circuit scale.

SUMMARY OF THE INVENTION

The present invention intends to solve such conventional problems and to make it possible to provide a chrominance signal processing circuit arrangement which can totally reduce the number of circuit elements and the size of the apparatus by using a digital circuit. It is therefore one object of the invention to provide a chrominance signal processing apparatus for frequency-converting a carrier chrominance signal in which the number of parts that are attached externally is made smaller as compared with that in the conventional apparatus and which can be produced as an IC with size reduction and cost reduction. Further, this processing apparatus makes it possible to provide an accurate frequency conversion which can also eliminate the frequency variation in a high frequency range that could not be conventionally eliminated easily.

To accomplish the above object, a chrominance signal processing apparatus according to the present invention processes sampled and digitized signals. In the chrominance signal processing apparatus provided with first frequency converting means which receives a first carrier chrominance signal and frequency-converts it to a second carrier chrominance signal whose carrier angular frequency is substantially equal to a second reference angular frequency by using a first frequency converting signal, there is not adopted a conventional method whereby the first frequency converting signal is derived in terms of an amplitude by multiplying an amplitude signal having an angular frequency difference signal component and an amplitude signal of a reference angular frequency and by filtering out unnecessary components. Rather, there is adopted a method whereby the first frequency converting signal is derived by adding or subtracting angular frequency signals or phase signals for conversion into the amplitude signal. In other words, the first angular frequency difference signal is derived by an APC circuit; this first angular frequency difference signal, a first reference angular frequency signal and a second reference angular frequency signal are added or subtracted to obtain the angular frequency signal; this angular frequency signal is integrated to obtain the first phase signal; and this first phase signal is converted to the amplitude signal, thereby obtaining the first frequency converting signal.

In the above-mentioned method, the same result can be also derived even if the first angular frequency difference signal, first reference angular frequency signal and second reference angular frequency signal are respectively converted to the phase signals and thereafter are added or subtracted. This will be obvious from the definition of the integration. Thus, in this disclosure, the expression such that the angular frequency signals are added or subtracted and then converted to the phase signals incorporates, unless otherwise specified, the meaning such that after the angular frequency signals are converted to the phase signals, they may be added or subtracted.

BRIEF DESCRIPTION OF THE DRAWINGS

The present invention will be apparent from the following detailed description in conjunction with the accompanying drawings, in which.

DESCRIPTION OF THE PREFERRED EMBODIMENTS

Embodiments of the present invention intend to process sampled and digitized signals and are realized by a digital signal processing circuit. All signals which are mentioned hereinbelow are the sampled and digitized signals even if their denominations are the same as those of the signals mentioned in the conventional example. An input signal in each embodiment of the invention is a signal which is obtained by analog-digital converting the input signal of the conventional chrominance signal processing apparatus. An output signal in each embodiment of the invention is digital-analog converted and thereafter the same output signal as that of the conventional chrominance signal processing apparatus is derived.

Prior to explaining in detail the embodiments of the present invention, a fundamental arrangement of the invention will be shown and its operation will be described.

Figure 2:
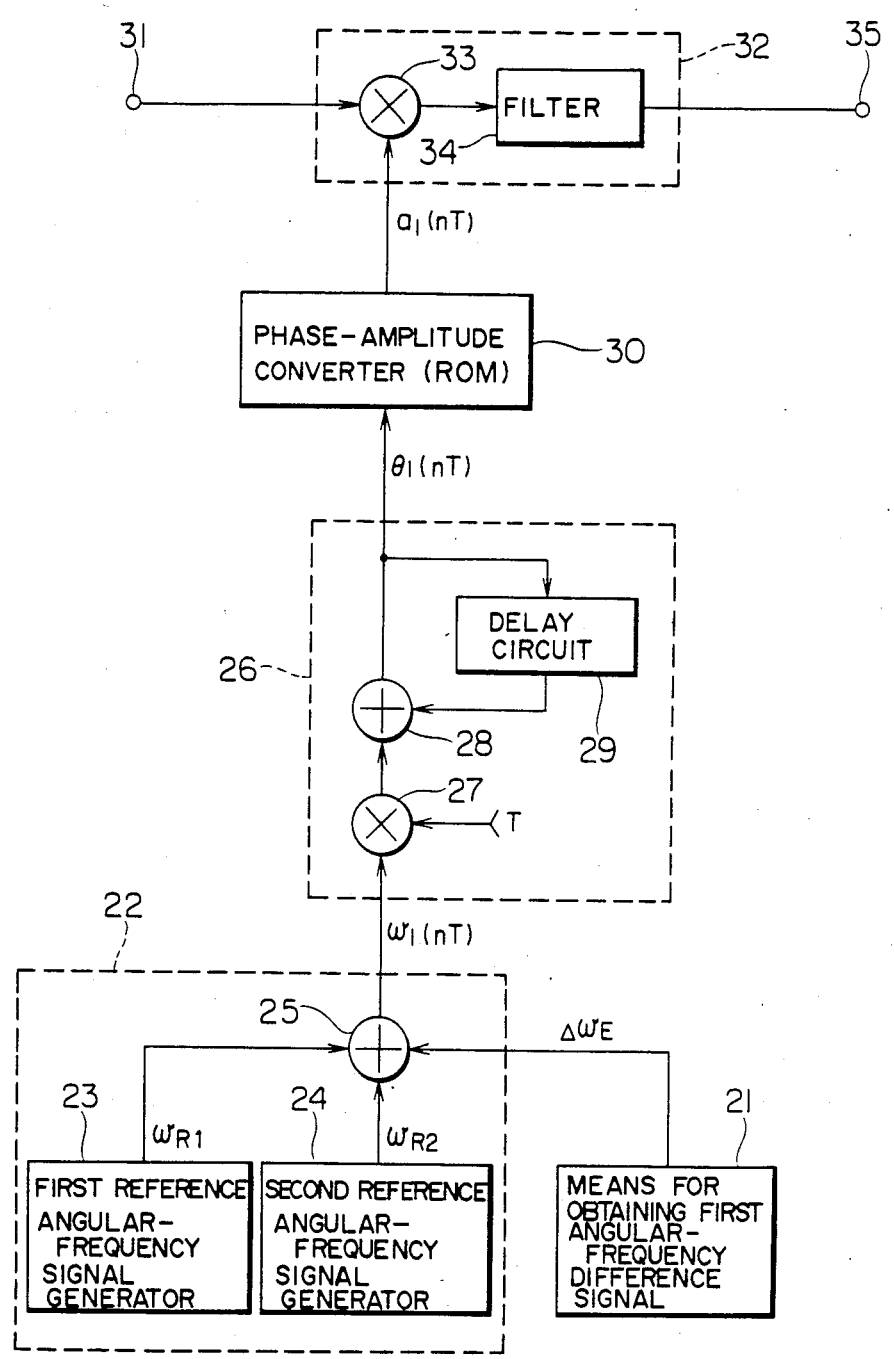
FIG. 2 is a block diagram showing a fundamental arrangement of the present invention.

FIG. 2 shows a block diagram showing the fundamental arrangement of the invention. In FIG. 2, reference numeral 21 denotes means for deriving a first angular frequency difference signal; 22 is means for obtaining a first angular frequency signal; 23 a first reference angular frequency signal generator; 24 a second reference angular frequency signal generator; 25 an adder/subtracter; 26 an integrator; 27 a multiplier; 28 an adder; 29 a delay circuit; 30 a first phase-amplitude converter; 31 an input terminal of a first carrier chrominance signal; 32 a frequency converter; 33 a multiplier; 34 a filter; and 35 an output terminal of a second carrier chrominance signal.

The fundamental operation will now be described hereinbelow with respect to the chrominance signal processing apparatus with the fundamental arrangement of the present invention which is constituted as mentioned above. The apparatus of the present invention is realized by a digital signal processing circuit which operates synchronously with a clock signal whose period is T. Therefore, time t is expressed discretely by $t=nT$ (n is an integer) and all signals are expressed by functions of $t=nT$. The means 21 for obtaining the first angular frequency difference signal outputs the first angular frequency difference signal $\Delta\omega_E(nT)$ which is nearly equal to the frequency $\Delta\omega_{C1}(nT)$ of the difference between a carrier angular frequency signal $\omega_{C1}(nT)$ of the first carrier chrominance signal and a first reference angular frequency signal $\omega\theta_1(nT)$ and constitutes a part of a digital APC loop. The first reference angular frequency signal $\omega_{R1}(nT)$ out-putted from the generator 23, a second reference angular frequency signal $\omega_{R2}(nT)$ outputted from the generator 24 and the first angular frequency difference signal $\Delta\omega_E(nT)$ are added or subtracted in the means 22 to produce the first angular frequency signal $\omega_1(nT)$. The first angular frequency signal $\omega_1(nT)$ is integrated by the integrator 26, so that a first phase signal $\theta_1(nT)$ is obtained. The integrator 26 is constituted in a manner such that the angular frequency signal $\omega_1(nT)$ is multiplied by a unit time T by the multiplier 27 to obtain a phase change per unit time. The phase change is supplied as one input of the adder 28 and an output of the adder 28 is delayed by a unit time using the delay circuit 29 which causes the delay of the time T. The delayed output is supplied as the other input of the adder 28. This is because the integration can be expressed such that $$\int \omega_1(t)dt = \sum_{i=0}^{n-1} \omega(iT) \cdot T = \theta_1(nT)$$

The first phase signal $\theta_1(nT)$ is converted to an amplitude signal $a_1(nT) = \cos(\theta_1(nT))$ by the phase-amplitude converter 30. For instance, the phase-amplitude converter 30 can be realized by a ROM (Read Only Memory) and data can be preliminarily stored in the ROM such that the ROM outputs data of $\cos \theta_1$ when the ROM receives the first phase signal $\theta_1(nT)$ as the address input signal. From the above explanation, the amplitude signal $a_1(nT)$ is collectively expressed by the following equation (in the case where the adder/subtracter 25 performs the addition). Namely, $$a_1(nT) = \cos\left(\sum_{i=0}^{n-1} (\omega_{R1}(iT) + \omega_{R2}(iT) + \Delta\omega_E(iT)) \cdot T\right) \quad (1)$$

In this case, the following equation is satisfied since the difference between the carrier angular frequency signal $\omega_{C1}(nT)$ of the first carrier chrominance signal and the first reference angular frequency signal $\omega_{R1}(nT)$ is nearly equal to the first angular frequency difference signal $\Delta\omega_E(nT)$. Namely, $$\omega_{R1}(nT) + \Delta\omega_E(nT) \approx \omega_{C1}(nT) \quad (2)$$

On one hand, since a carrier angular frequency $\omega_{C2}(nT)$ of the second carrier chrominance signal is substantially equal to the second reference angular frequency $\omega_{R2}(nT)$, the following equation is satisfied. Namely, $$\omega_{C2}(nT) \approx \omega_{R2}(nT) \quad (3)$$

From equations (2) and (3), equation (1) can be expressed as follows.

$$a_1(nT) \approx \cos\left(\sum_{i=0}^{n-1} (\omega_{C1}(iT) + \omega_{C2}(iT)) \cdot T\right) \quad (4)$$

$$\approx \cos(\int (\omega_{C1}(t) + \omega_{C2}(t))dt)$$

This equation indicates that the amplitude signal $a_1(nT)$ is the first frequency converting signal. The frequency converter 32 converts the first carrier chrominance signal to the second carrier chrominance signal using the first frequency converting signal. Namely, the first carrier chrominance signal as the amplitude signal is multiplied by the first frequency converting signal by the multiplier 33, thereby obtaining the amplitude signals having the carrier angular frequencies corresponding to the sum and difference of the carrier angular frequencies of both of these signals (either one of these carrier angular frequencies is equal to the carrier angular frequency of the second carrier chrominance signal), and the second carrier chrominance signal is separated by the filter 34 (digital filter, in which the center angular frequency of the pass band is the angular frequency $\omega_{C2}$ of the second carrier chrominance signal) and is outputted from the terminal 35.

Figure 1A:
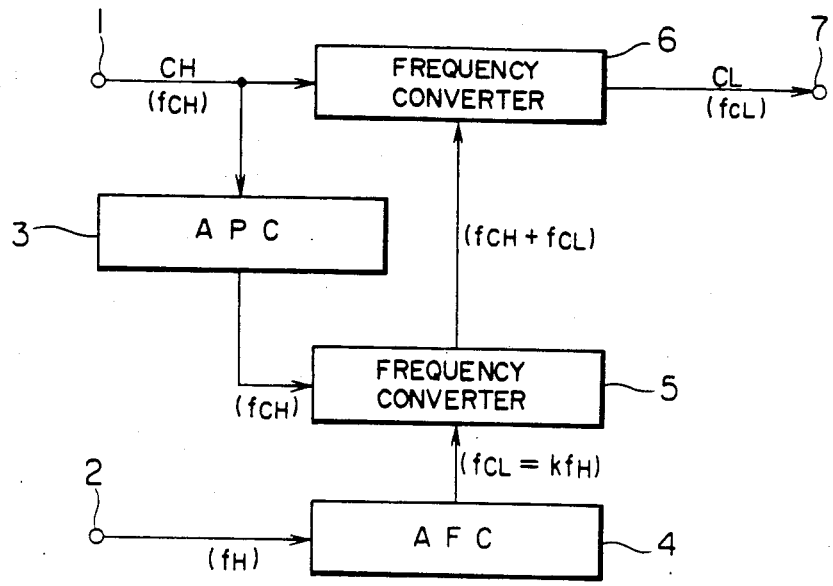
FIGS. 1(a) and 1(b) are diagrams showing recording and reproducing blocks of a conventional chrominance signal processing apparatus.
Figure 1B:
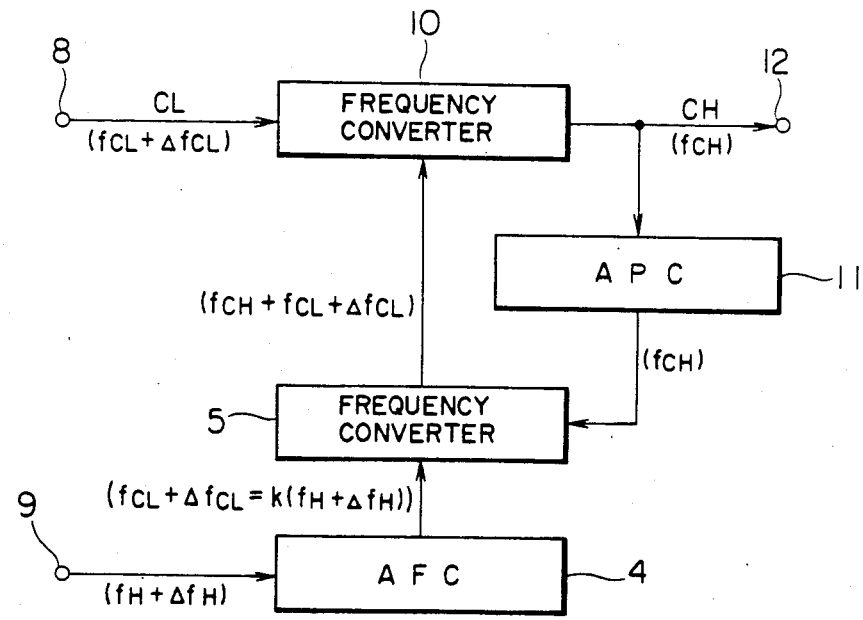

As described above, according to the present invention, the frequency converting signal necessary to frequency-convert the first carrier chrominance signal to the second carrier chrominance signal is directly obtained in such a manner that: the angular frequency signal which is equal to the angular frequency of the frequency converting signal is derived by performing the addition or subtraction in the angular frequency region; the phase signal is derived by integrating this angular frequency signal; and further this phase signal is phase-amplitude converted. Therefore, there is no need to use a frequency converter, such as frequency converter 5 in FIG. 1, for obtaining the frequency converting signal as in the conventional example. In particular, such frequency converters have therein a filter and a multiplier which have steep frequency characteristics. In the case where digital circuits are used to constitute the filter and multiplier, the converter circuit scale becomes large. Therefore, the omission of the frequency converter presents a large effect such that the circuit scale of the chrominance signal processing apparatus can be reduced.

On the other hand, the angular frequency of the frequency converting signal may be either one of the sum or difference angular frequency between the carrier angular frequency of the first carrier chrominance signal and the carrier angular frequency of the second carrier chrominance signal. Therefore, in the foregoing explanation regarding the operation, it is assumed that the adder/subtracter 25 performs the adding operation, so that the frequency converting signal having the angular frequency of the sum is derived. However, it is obviously possible to adopt the arrangement in which the frequency converting signal having the angular frquency of the difference is obtained by allowing the adder/subtracter 25 to perform the subtracting operation. The same shall apply with respect to the embodiments of the present invention which will be explained hereinbelow.

Although the angular frequency signal and phase signal are used in the foregoing fundamental arrangement for convenience of explanation, it is apparent that these signals may be replaced by the signals of values equal to their values multiplied by a certain constant. For instance, the outputs of the means for obtaining the first angular frequency difference signal and of the first and second reference angular frequency signal generators may be the respective angular frequency signals of values equal to their above output values multiplied by the constant T (clock period), namely, $\omega_1 T$ and $\omega_2 T$ (these correspond to the phase differences for the unit time of T). In this case, the multiplier 27 (FIG. 2) can be omitted.

Figure 3:
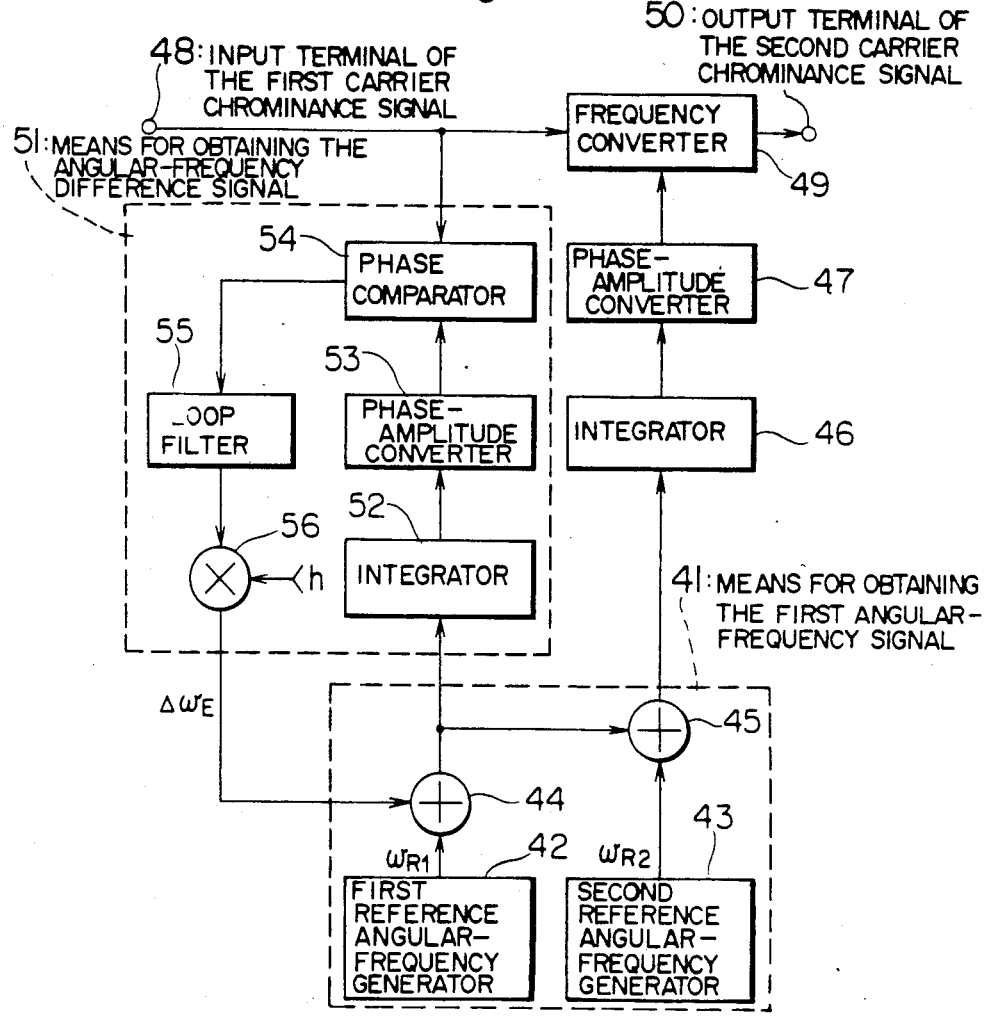
FIG. 3 is a block diagram showing an arrangement of the first embodiment of the invention.

FIG. 3 shows a block diagram of a chrominance signal processing apparatus of the first embodiment of the present invention. In FIG. 3, a reference numeral 41 denotes means for obtaining the first angular frequency signal; 42 is a first reference angular frequency signal generator; 43 a second reference angular frequency signal generator; 44 and 45 adders; 46 an integrator; 47 a phase-amplitude converter; 48 an input terminal of the first carrier chrominance signal; 49 a frequency converter; 50 an output terminal of the second carier chrominance signal; 51 means for obtaining the first angular frequency difference signal; 52 an integrator; 53 a phase-amplitude converter; 54 a phase comparator; 55 a loop filter; and 56 a multiplier.

The operation of the chrominance signal processing apparatus constituted as mentioned above will be described hereinbelow. A first angular frequency difference signal $\Delta\omega_E$ from the multiplier 56 and a first reference angular frequency signal $\omega_{R1}$ from the generator 42 are added by the adder 44, thereby obtaining a second angular frequency signal ($\omega_{R1}+\Delta\omega_E$). A second phase signal is derived by integrating the second angular frequency signal by the integrator 52. This second phase signal is converted to an amplitude signal by the phase-amplitude converter 53, so that a phase comparison signal is obtained. The phase comparator 54 compares the phases of the burst signal in the first carrier chrominance signal and of the phase comparison signal and then outputs a phase difference signal. The phase difference signal is band-limited by the loop filter 55 and is converted to the angular frequency and is then multiplied by a constant h corresponding to the loop gain by the multiplier 56, so that it is converted to the first angular difference frequency signal $\Delta\omega_E$.

In this case, an APC circuit is constituted by a loop consisting of the integrator 52→phase-amplitude converter 53→phase comparator 54→loop filter 55→multiplier 56→adder 44→integrator 52, so that $\Delta\omega_E=\Delta\omega_{C1}$ and the second angular frequency signal which is equal to the carrier angular frequency $\omega_{C1}$ of the first carrier chrominance signal is derived as the output of the adder 44. The first angular frequency signal is derived by adding this second angular frequency signal and a second reference angular frequency signal $\omega_{R2}$ from the generator 43 by the adder 45. The first phase signal is obtained by integrating the first angular frequency signal by the integrator 46. The frequency converting signal is derived by converting this first phase signal to the amplitude signal by the phase-amplitude converter 47. The frequency converter 49 performs the frequency conversion of the first carrier chrominance signal whose carrier angular frequency is $\omega_{C1}$, by using the frequency converting signal whose angular frequency is ($\omega_{C1}+\omega_{R2}$), so as to output the converted signal having the angular frequency of the difference in angular frequency between the first carrier chrominance signal and the frequency converting signal. Therefore, the carrier angular frequency $\omega_{C2}$ of the second carrier chrominance signal thus obtained becomes (($\omega_{C1}+\omega_{R2})-\omega_{C1}$), namely, $\omega_{R2}$.

An arrangement and operation in the case where the chrominance signal processing circuit of the above embodiment is applied to a VTR will now be described.

Upon recording, the first carrier chrominance signal is the carrier chrominance signal CH and the second carrier chrominance signal is the carrier chrominance signal CL. In this case, the first reference angular frequency signal generator 42 is constituted to output an angular frequency signal of a constant frequency value nearly equal to an angular frequency $\omega_{CH}(\equiv2\pi f_{CH})$ of the carrier chrominance signal CH, while the second reference angular frequency signal generator 43 is constituted to output an angular frequency signal $k\cdot\omega_H$ where the angular frequency $\omega_H$ ($\equiv2\pi f_H$) of the horizontal sync signal is multiplied by a constant K, namely, it is constituted as an AFC circuit. Thus, the angular frequency which is equal to the carrier angular frequency $\omega_{CH}$ of the input carrier chrominance signal CH is derived as the output of the adder 44. Even if the angular frequency $\omega_H$ of the input horizontal sync signal has variation components, an angular frequency $k\omega_H$ ($=\omega_{CL}$) which is proportional to these variation components can be always obtained from the second reference angular frequency signal generator 43, so that the carrier angular frequency of the second carrier chrominance signal becomes $k\omega_H$ as specified. This arrangement (comprised of the APC circuit and AFC circuit) corresponds to that the invention is applied to in the arrangement of the recording system shown in FIG. 1(a). On one hand, the second reference angular frequency signal generator 43 may be simply constituted in a manner such that a constant value which is nearly equal to $k\omega_H$ is derived (comprised of only the APC circuit).

Upon reproduction, the first carrier chrominance signal is the carrier chrominance signal CL having a time base variation component and the second carrier chrominance signal is the carrier chrominance signal CH. In this case, the first reference angular frequency signal generator 42 is constituted to output an angular frequency (constant value) which is nearly equal to the carrier angular frequency $\omega_{CL}$ ($\equiv k\omega_H$) of the carrier chrominance signal CL, while the second reference angular frequency (constant value) which is equal to the carrier angular frequency $\omega_{CH}$ (this is defined by a numeric value itself) of the carrier chrominance signal CH. Thus, an angular frequency signal which is equal to the carrier angular frequency $\omega_{CL}$ of the carrier chrominance signal CL having a time base fluctuation component is outputted as the output of the adder 44. The constant value $\omega_{CH}$ is outputted from the second reference angular frequency signal generator 43. Therefore, the carrier chrominance signal CH of the carrier angular frequency from which the time base variation is eliminated, namely, of the constant value $\omega_{CH}$ is derived as the second carrier chrominance signal. In addition, even if the first reference angular frequency signal generator 42 is constituted, as the AFC circuit, such as to output an angular frequency of $k\cdot\omega_H$ in keeping with the angular frequency $\omega_H$ of the input horizontal sync signal, the same output signal is obtained as the output of the adder 44; therefore, the same effect can be obtained.

Figure 4:
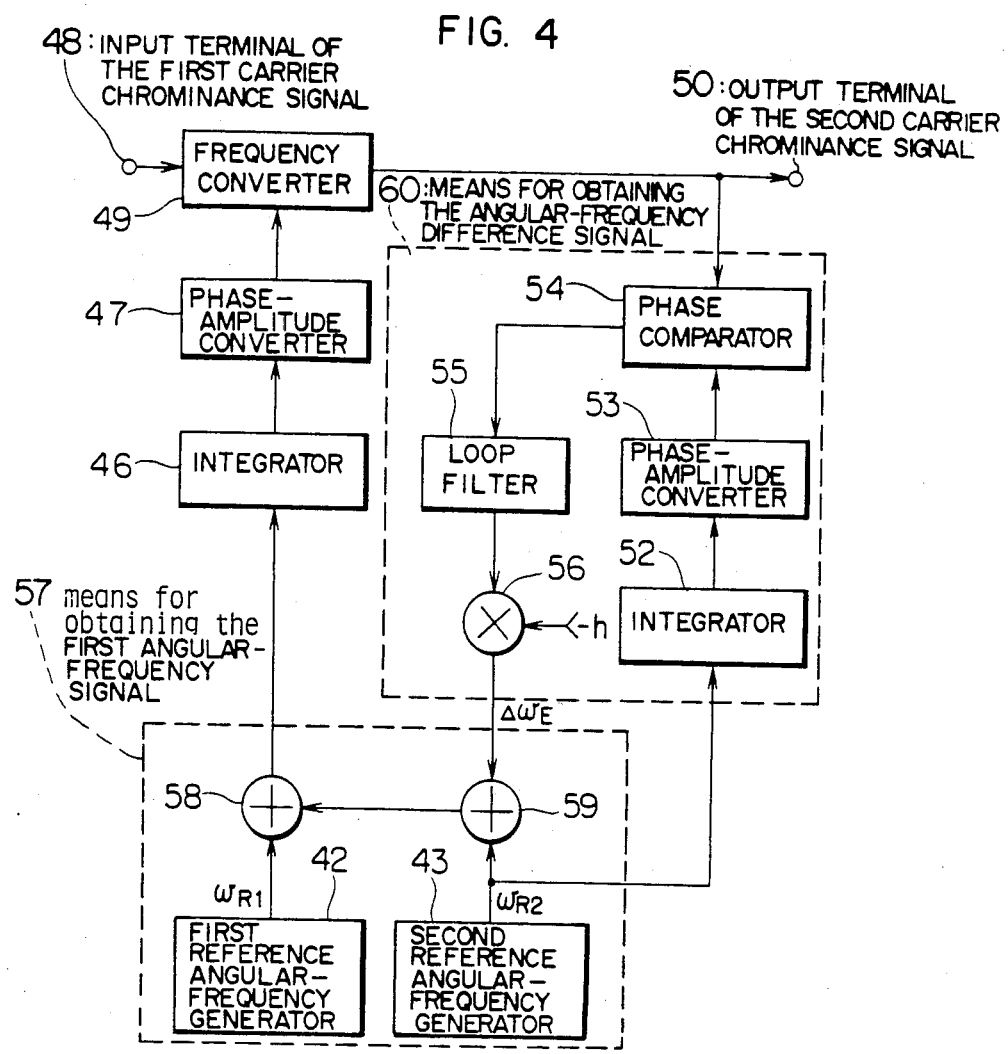
FIG. 4 is a block digram showing an arrangement of the second embodiment of the invention.

FIG. 4 shows a block diagram of a chrominance signal processing apparatus of the second embodiment of the present invention. In FIG. 4, the parts and components having the same functions as those in the block shown in FIG. 3 are designated by the same reference numerals and their descriptions are omitted. In FIG. 4, a reference numeral 57 denotes means for obtaining the first angular frequency signal; 58 is an adder; 59 an adder; and 60 means for obtaining the angular frequency difference signal. Different points from the arrangement of the first embodiment of the invention shown in FIG. 3 are that: the input signal to the means for obtaining the first angular frequency difference signal is the second carrier chrominance signal and the second reference angular frequency signal; one input to the multiplier 56 is −h; and a method of fetching the signal from means for obtaining the first angular frequency signal.

The operation of the chrominance signal processing apparatus of this embodiment constituted as mentioned above will now be described hereinbelow. The second phase signal is obtained by integrating the angular frequency signal $\omega_{R2}$ from the second reference signal generator 43 by the integrator 52. The phase comparison signal is derived by converting the second phase signal to the amplitude signal by the phase amplitude converter 53. The phase comparator 54 multiplies the burst signal in the second carrier chrominance signal and the phase comparison signal and then outputs the phase difference signal. This phase difference signal is band-limited by the loop filter 55 and is multiplied by the constant −h by the multiplier 56, so that it is converted to the first angular frequency difference signal $\Delta\omega_E$. The adder 59 adds the second reference angular frequency signal $\omega_{R2}$ from the generator 43 and the first angular frequency difference signal $\Delta\omega_E$. The adder 58 adds the output of the adder 59 and the first reference angular frequency signal $\omega_{R1}$ from the first reference angular frequency signal generator 42. Thus, the adder 58 outputs a first angular frequency signal ($=\omega_{R1}+\omega_{R2}+\Delta\omega_E$). The first angular frequency signal is integrated by the integrator 46 and is converted to the first phase signal. This first phase signal is converted to the amplitude signal by the phase-amplitude converter 47, thereby obtaining the frequency converting signal. By using the frequency converting signal having the angular frequency of ($\omega_{R1}+\omega_{R2}+\Delta\omega_E$), the frequency converter 49 frequency-converts the first carrier chrominance signal whose carrier angular frequency is $$\omega_{C1} (=\omega_{R1}+\Delta\omega_1) \quad (7)$$

to obtain the second carrier chrominance signal having the angular frequency of the difference in angular frequency between this first carrier chrominance signal and the frequency converting signal. Therefore, the carrier angular frequency $\omega_{C2}$ of the second carrier chrominance signal thus derived becomes $$\omega_{C2}=\omega_{R1}+\omega_{R2}+\Delta\omega_E-\omega_{C1} \quad (8)$$

From equations (7) and (8), therefore, we will have $$\omega_{C2}=\omega_{R2}+\Delta\omega_E-\Delta\omega_1$$

Since the second carrier chrominance signal is one input of the phase comparator 54, an APC circuit is constituted by a loop consisting of the phase comparator 54→loop filter 55→multiplier 56→adder 59→adder 58→integrator 46→phase-amplitude converter 47→frequency converter 49→phase comparator 54, so that $\Delta\omega_E=\Delta\omega_1$. Namely, due to the means 60 for obtaining the angular frequency difference signal, it is possible to obtain the same output as that of the means 51 for deriving the angular frequency difference signal in the first embodiment of the present invention shown in FIG. 3. The angular frequency signal $\omega_{C2}$ of the second carrier chrominance signal becomes equal to the first reference angular frequency signal $\omega_{R2}$.

An arrangement and operation in the case where the chrominance signal processing circuit of this embodiment is applied to a VTR will now be described.

Upon recording, the first carrier chrominance signal is the carrier chrominance signal CH and the second carrier chrominance signal is the carrier chrominance signal CL. In this case, the first reference angular frequency signal generator 42 is constituted to output an angular frequency (constant value) which is nearly equal to the carrier angular frequency $\omega_{CH}$ of the carrier chrominance signal CH, while the second reference angular frequency signal generator 43 is the AFC circuit and is constituted to output an angular frequency signal of $k\cdot\omega_H$. Due to this, the carrier angular frequency of the second carrier chrominance signal becomes $k\cdot\omega_H$ as specified. In addition, the generator 43 may be simply constituted such as to derive an angular frequency (constant value) which is nearly equal to $k\cdot\omega_H$.

Upon reproduction, the first carrier chrominance signal is the carrier chrominance signal CL having a time base variation component and the second carrier chrominance signal is the carrier chrominance signal CH. In this case, the first reference angular frequency signal generator 42 is constituted to output an angular frequency (constant value) which is nearly equal to the carrier angular frequency $\omega_{CL}$ ($=k\omega_H$) of the carrier chrominance signal CL. The second reference angular frequency signal generator 43 is constituted to output an angular frequency (constant value) which is equal to the carrier angular frequency $\omega_{CH}$ of the carrier chrominance signal CH. Thus, as the second carrier chrominance signal, the carrier chrominance signal CH of the carrier angular frequency of which the time base variation is eliminated, namely, of a constant value $\omega_{CH}$ is obtained. On one hand, the first generator 42 may be constituted as an AFC circuit and this constitution corresponds to that the invention is applied to in the arrangement of the reproducing system shown in FIG. 1(b).

Figure 5:
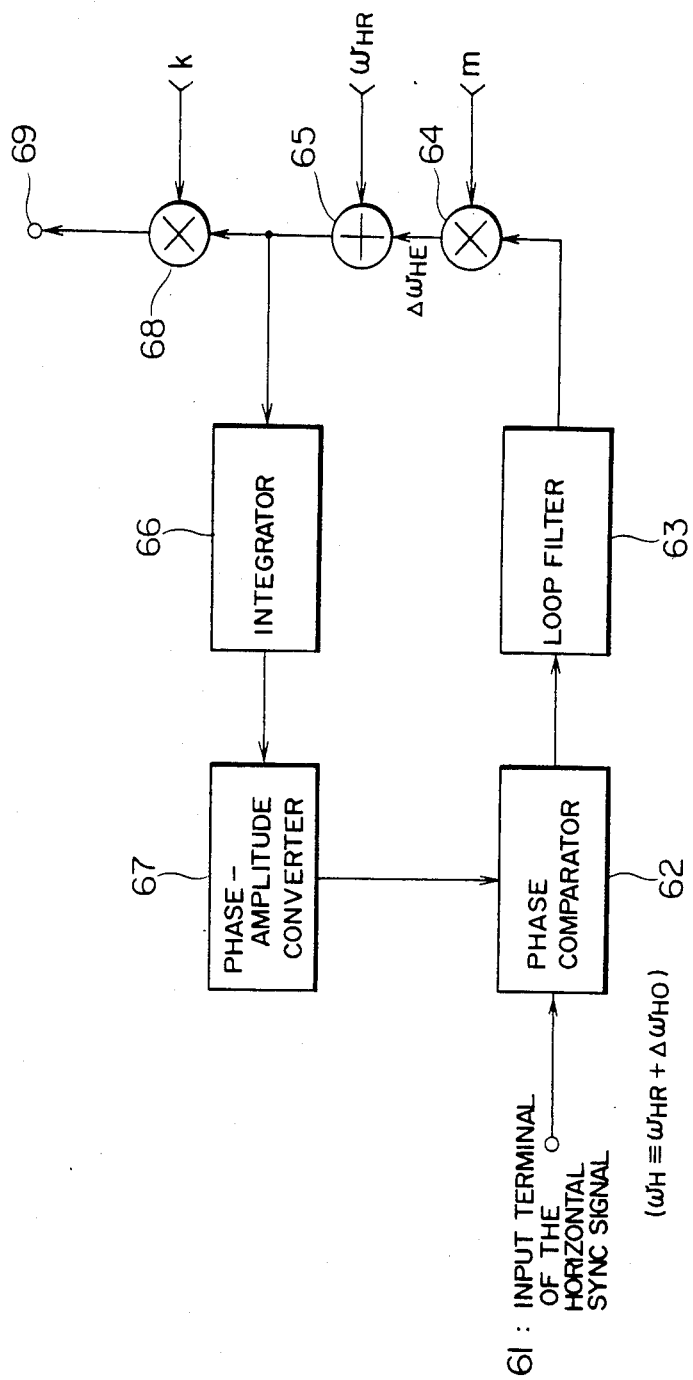
FIG. 5 is a block diagram showing an example of an arrangement in the case where a first or second reference angular frequency signal generator is an AFC circuit.

FIG. 5 shows a block diagram of the AFC circuit, which may form the first reference angular frequency signal generator or second reference angular frequency signal generator shown in FIGS. 2 to 4 and which outputs the angular frequency signal whose angular frequency is equal to the horizontal sync signal frequency multiplied by the contant k. In FIG. 5, a reference numeral 61 denotes an input terminal of the horizontal sync signal; 62 is a phase comparator; 63 a loop filter; 64 a multiplier; 65 an adder; 66 an integrator; 67 a phase-amplitude converter; 68 a multiplier; and 69 an output terminal.

The operation of the AFC circuit constituted as mentioned above will then be described hereinbelow.

The phase comparator 62 outputs the phase difference between the horizontal sync signal inputted from the terminal 61 and an amplitude signal from the phase-amplitude converter 67. This output is supplied through the loop filter 63 to the multiplier 64 and then it is multiplied by a constant m by the multiplier 64, so that a horizontal angular frequency difference signal $\Delta\omega_{HE}$ is obtained. The adder 65 adds an angular frequency (constant) $\omega_{HR}$ which is nearly equal to the angular frequency of the horizontal sync signal and the foregoing horizontal angular frequency difference signal $\Delta\omega_{HE}$. This added output is integrated by the integrator 66 and converted to the phase signal. This phase signal is converted to the amplitude signal by the phase-amplitude converter 67 and supplied as one input to the phase comparator 62.

An angular frequency signal $\omega_H$ of the input horizontal sync signal is defined by the following equation.

$$\omega_H = \omega_{HR} + \Delta\omega_{HO} \tag{12}$$

On the other hand, there is constituted a loop consisting of the phase comparator 62→loop filter 63→multiplier 64→adder 65→integrator 66→phase-amplitude converter 67→phase comparator 62. Therefore, similarly to the case of the APC circuit, $\Delta\omega_{HE} = \Delta\omega_{HO}$ and an angular frequency signal which is equal to the angular frequency of the input horizontal sync signal is derived as the output of the adder 65. The necessary reference angular frequency signal is derived by multiplying the foregoing angular frequency signal by the constant k by the multiplier 68.

Figure 6:
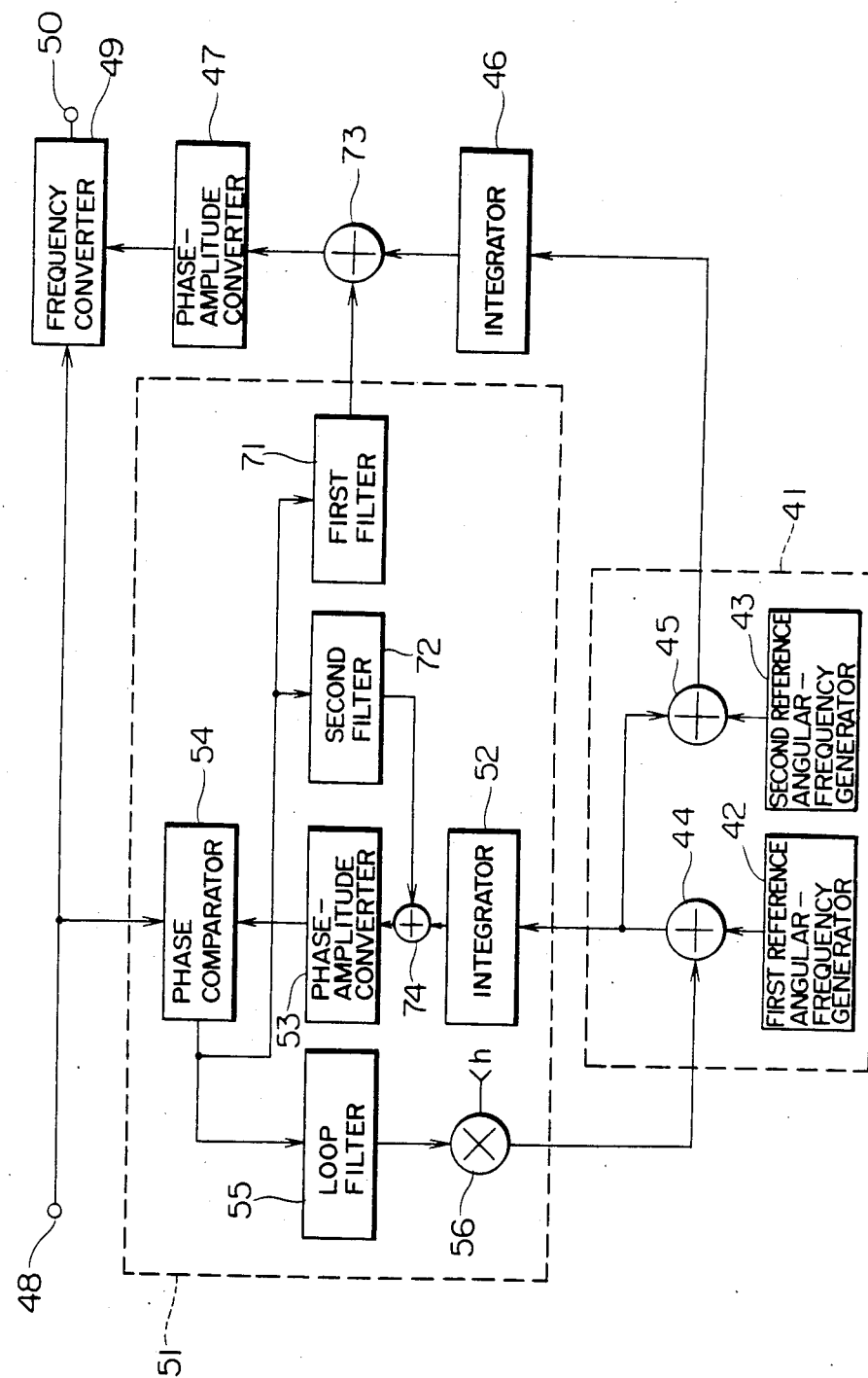
FIG. 6 is a block diagram showing an arrangement of the third embodiment of the invention.

FIG. 6 shows a block diagram of a chrominance signal processing apparatus of the third embodiment of the present invention. This diagram shows that it is possible to easily add means for further accurately performing the frequency conversion in the first embodiment of FIG. 3. In FIG. 6, the parts and components which perform the similar operations as those in the first embodiment in FIG. 3 are designated by the same reference numerals and their descriptions are omitted. A different point from the arrangement in FIG. 3 is that there are provided: a first filter 71 for converting the phase difference signal which is the output signal of the phase comparator 54 to a first residual phase difference signal; a second filter 72 for converting the phase difference signal to a second residual phase difference signal; an adder 73 for adding the above first residual phase difference signal to the output signal of the integrator 46; and an adder 74 for adding the above second residual phase difference signal to the output signal of the integrator 52.

In FIG. 6, the APC loop is constituted by the adder 44→integrator 52→phase-amplitude converter 53→phase comparator 54→loop filter 55→multiplier 56→ adder 44. Similar to the case of the analog signal process, in case of the digital signal process, in particular, the signal processing periods of time for those circuits may cause problems. The band of the APC loop is limited due to the possible delay in those circuits, so that the APC circuit does not sufficiently respond to frequency variations in a high frequency band. Practically speaking, the phase difference signal derived as the result of the phase comparison is once converted to the angular frequency difference signal and this converted difference signal is again converted to the phase signal thereby feeding back this phase signal to the phase comparison signal. Therefore, in the case of the digital signal process, it takes a long time for the signal process, a large loop gain is required to largely change the phase comparison signal by the phase difference signal, and there is a limitation for the purpose of stability of the system; therefore, according to this method, the result of the phase comparison cannot be fed back to the phase comparison signal itself which was phase compared. In this case, the phase comparison result is fed back at least after one horizontal scan period $T_H$.

The operation of the APC loop will now be analyzed by paying attention to the phase difference signal. To make the following analysis easy, it is assumed that one value of the phase difference signal is determined for each burst signal and the width of the burst signal is enough smaller than $T_H$, and this is ignored. The phase difference signal can be regarded as the signal which varies at every $T_H$, namely, the signal which is constant for $T_H$.

When it is now assumed that the phase in the first carrier chrominance signal is $$\theta_{C1}(nT_H) = \theta_{R1}(nT_H) + \Delta\theta_1(nT_H)$$

and the phase of the phase comparison signal is $$\theta_p(nT_H) = \theta_{R1}(nT_H) + \Delta\theta_E(nT_H)$$

the phase difference signal $\Delta\theta_p(nT_H)$ becomes $$\Delta\theta_p(nT_H) = \Delta\theta_1(nT_H) - \Delta\theta_E(nT_H)$$

This phase difference signal is divided by $T_H$ and is multiplied by the loop gain h and the characteristic of the loop filter is given to this, so that the angular frequency difference signal $\Delta\omega_E(nT_H)$ is derived. The integrator 52 integrates the second angular frequency signal which is obtained by adding a first reference angular frequency $\omega_{R1}(nT_H)$ to this angular frequency difference signal. However, the second angular frequency signal is generally constant for $T_H$; therefore, if this signal is expressed as a function of $T_H$, $$\theta_p(nT_H) = \sum_{i=0}^{n-1} \omega_{R1}(iT_H) \cdot T_H + \sum_{i=0}^{n-1} \Delta\omega_E(iT_H) \cdot T_H$$

where, $$\theta_{R1}(nT_H) = \sum_{i=0}^{n-1} \omega_{R1}(iT_H) T_H$$

$$\Delta\theta_E(nT_H) = \sum_{i=0}^{n-1} \Delta\omega_E(iT_H) T_H$$

Therefore, a Z-transform $\Delta\Phi(Z)$ of $\Delta\theta_E(nT_H)$ is $$\Delta\Phi_E(Z_H) = \frac{Z_H^{-1}}{1 - Z_H^{-1}} \cdot \Delta W_E(Z_H) \cdot T_H$$

where, $Z_H$ is an operator of the Z-transform of the time discrete system of the sampling period $T_H$ and $\Delta W_E(Z_H)$ is a Z-transform of $\Delta\omega_E(nT_H)$. On one hand, assuming that a transfer characteristic of the loop which is mainly determined due to the loop filter is $G(Z)$, $\Delta W_E(Z)$ will become $$\Delta W_E(Z_H) = hG(Z_H) \cdot \Delta\Phi_p(Z_H) \cdot \frac{1}{T_H}$$

using the Z-transform $\Delta\Phi_p(Z)$ of the phase difference signal. Also, since $$\Delta\Phi_p(Z_H) = \Delta\Phi_1(Z_H) - \Delta\Phi_E(Z_H)$$

we have $$\Delta\Phi_E(Z_H) = \frac{kG(Z_H)Z_H^{-1}}{1 - Z_H^{-1}} \Delta\Phi_p(Z)$$

Thus, we have $$\Delta\Phi_p(Z_H) = \frac{1 - Z_H^{-1}}{1 - Z_H^{-1} + hG(Z) \cdot Z_H^{-1}} \cdot \Delta\Phi_1(Z_H)$$

This equation is the high frequency band pass characteristic and shows that the phase variation in a low frequency band is eliminated. On the other hand, for the input frequency variation, $\Delta\Phi_1(nT)$ becomes a function which monotonically increases with n. Therefore, assuming that $\Delta\theta_1(nT) = n \cdot \Delta\omega_1$ ($\Delta\omega_1$ is constant), $$\Delta\Phi_1(Z_H) = \frac{Z_H^{-1}}{(1 - Z_H^{-1})^2} \cdot \Delta\omega_1$$

Consequently, the inverse transform of $\Delta\Phi_p(Z_H)$ becomes $$\Delta\theta_p(nT) = \frac{\Delta\omega_1}{h}$$

when it is calculated by setting $G(Z)=1$. This equation shows that the phase difference signal becomes a constant value.

The first filter 71 and adder 73 serve to eliminate this $\Delta\Phi_p(Z_H)$. For instance, assuming that the gain of the first filter is "1", the variation component is completely eliminated by the frequency converter 49. When it is assumed that the gain of the first filter is h, the variation component is increased by $(1-h)$ times larger. However, if the phase variation is perfectly eliminated, there is contrarily a possibility such that an unnecessary response to noise is caused. Therefore, it is necessary to make it possible to completely eliminate the variation for the low frequency band by appropriately changing the gain in dependence upon the frequency and thereby preventing that the variation is so largely eliminated in the high frequency band.

Now, assuming that $G(Z)=1$, $$\Delta\Phi_p(Z_H) = \frac{1 - Z_H^{-1}}{1 - (1-h)Z_H^{-1}} \Delta\Phi_1(Z_H)$$

so that the frequency characteristic becomes $$\left. \frac{1 - Z_H^{-1}}{1 - (1-h)Z_H^{-1}} \right|_{Z_H = -1} = \frac{2}{2-h}$$

in the high frequency band near $f=1/T_H$. In addition, since $0 < H < 1$ from the stabilization condition of the system, we have $$\frac{2}{2-h} > 1.$$

This means that the variation component is emphasized in a high band. This is because the signal is not fed back to the phase compared burst signal of itself or the phase comparison signal. For improvement of this, the phase difference signal is directly added to the second phase signal using the second filter 72 and adder 74, so that this problem can be solved. Namely, assuming that the characteristic of the second filter is set to $hG(Z)$, $$\Delta\Phi_E(Z_H) = \frac{HG(Z_H)Z_H^{-1}}{1 - Z_H} \Delta\Phi_p(Z_H) + hG(Z_H)\Delta\Phi_p(Z_H)$$

$$= \frac{hG(Z_H)}{1 - Z_H} \Delta\Phi_p(Z_H)$$

In this case, since $$\Delta\Phi_p(Z_H) = \frac{1 - Z_H^{-1}}{1 + hG(Z) - Z_H^{-1}} \Delta\Phi_1(Z_H)$$

we have $$\frac{2}{2+h}$$

in a high band when $G(Z)=1$. This value is smaller than "1". Therefore, this means that the frequency characteristic of the APC loop is improved.

In the foregoing description, in case of the analog signal process, the variation component remaining in the APC circuit can be detected. However, it is difficult to add or subtract this variation component to or from the frequency converting signal and phase comparison signal. Expensive and complicated signal processes such as a variable delay line or the like are needed. Also, it is difficult to increase the accuracy of the system. However, the use of the present invention makes it possible to add or subtract the variation component in an angular frequency region or phase region, so that this addition or subtraction can be simply and accurately performed.

Figure 7:
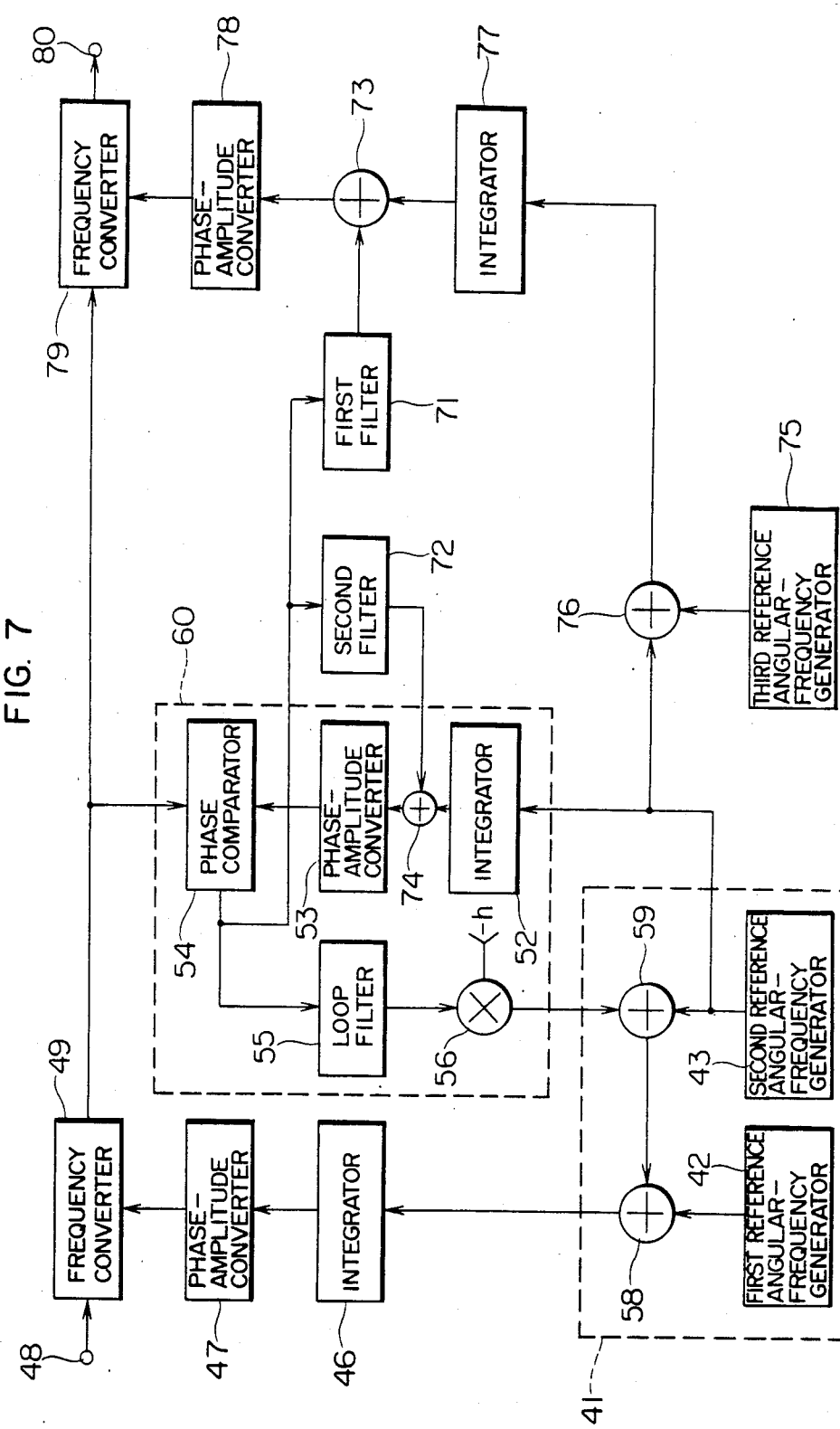
FIG. 7 is a block diagram showing an arrangement of the fourth embodiment of the invention.

FIG. 7 shows a block diagram of a chrominance signal processing apparatus of the fourth embodiment of the present invention. This diagram shows that it is possible to easily add means for further accurately performing the frequency conversion in the second embodiment in FIG. 4. In this diagram, the parts and components which perform the similar operations as those shown in FIGS. 4 and 6 are designated by the same reference numerals and their descriptions are omitted. The fourth embodiment of the present invention is constituted in a manner such that the following components are added to the second embodiment in FIG. 4: means for converting the second carrier chrominance signal to a third carrier chrominance signal, i.e., a third reference angular frequency signal generator 75; an adder 76 for adding the second and third reference angular frequency signals; and integrator 77; a phase-amplitude converter 78; a frequency converter 79; an output terminal 80 of the third carrier chrominance signal; and means for further accurately performing the frequency conversion in the third embodiment in FIG. 6, i.e., the first filter 71, second filter 72, and adders 73 and 74. Similarly to the third embodiment in FIG. 6, in this fourth embodiment as well, the frequency conversion can be performed while eliminating accurately the frequency variation in the first carrier chrominance signal over a wider frequency band. In addition, as a circuit scale, by setting the second reference angular frequency to $1/N$ and further to $1/2N$ (N is an integer) of the sampling frequency, the scale of the multiplier constituting the phase comparator can be made small. Also, the first carrier chrominance signal is the carrier chrominance signal which is converted to the signal in a low frequency band in the reproducing system of a VTR. Therefore, in this case, by setting the second reference angular frequency to be low, the sampling frequency of the signal which is processed by the frequency converter 49 is made low, thereby making the scales of the phase amplitude converter 47 and frequency converter 49 small and thereby making it possible to prevent the overall scale from becoming much larger than the third embodiment shown in FIG. 6.

Figure 8:
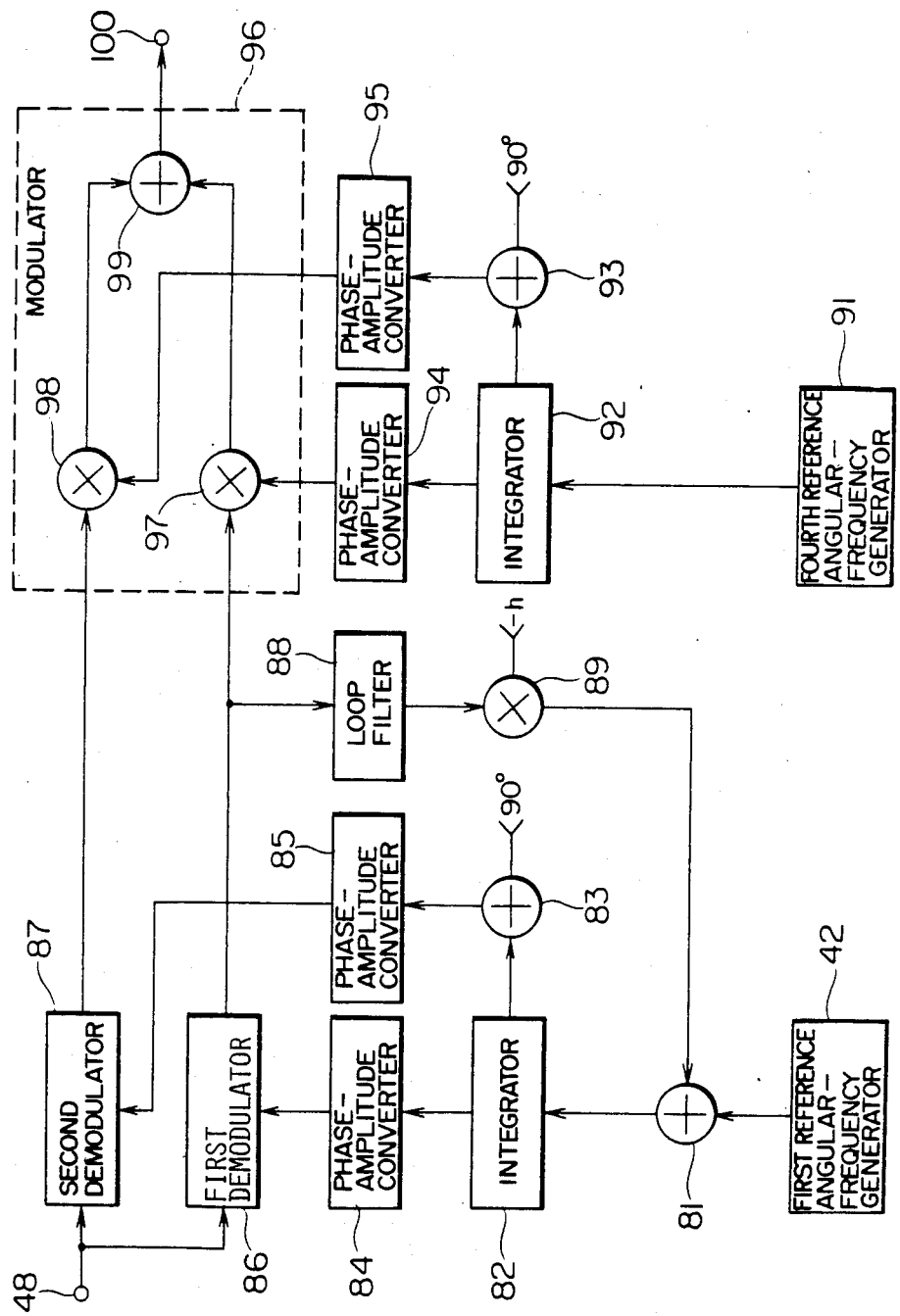
FIG. 8 is a block diagram showing an arrangement of the fifth embodiment of the invention.

FIG. 8 shows a block diagram of a chrominance signal processing apparatus of the fifth embodiment of the invention. This fifth embodiment corresponds to the case where the second reference angular frequency in the second and third embodiments of the invention shown in FIGS. 4 and 6 is zero, namely, the second carrier chrominance signal is the demodulation signal and consists of a demodulating section and a modulating section. In FIG. 8, a reference numeral 48 denotes the input terminal of the first carrier chrominance signal; 42 is the first reference angular frequency signal generator; 81 an adder; 82 an integrator; 83 an adder; 84 and 85 phase-amplitude converters; 86 a first demodulator; 87 a second demodulator; 88 a loop filter; 89 a multiplier; 91 a fourth reference angular frequency signal generator; 92 an integrator 93; an adder; 94 and 95 phase amplitude converters; 96 a modulator; 97 and 98 multipliers; 99 an adder; and 100 an output terminal of a fourth carrier chrominance signal.

The operation of the fifth embodiment constituted as described above will be explained hereinbelow. In the demodulating section, the adder 81 adds the first reference angular frequency signal and the first angular frequency difference signal to obtain a third angular frequency signal. This third angular frequency signal is integrated by the integrator 82, so that a third phase signal is integrated by the integrator 82, so that a third phase signal is derived. The adder 83 adds a phase signal of 90 degrees to the third phase signal, thereby obtaining a fourth phase signal. The phase amplitude converters 84 and 85 convert the third and fourth phase signal to the amplitude signals thereby deriving first and second frequency converting signal for demodulation. The first and second demodulators 86 and 87 demodulate the first carrier chrominance signal inputted from the input terminal 48 by use of the first and second frequency converting signals for demodulation having angular frequencies which are substantially equal to the angular frequency of the first carrier chrominance signal and having a phase difference of 90° with each other, thereby obtaining first and second demodulation signals. The loop filter 88 takes out the burst signal portion of the first demodulation signal, which is appropriately band-limited and converted to the angular frequency signal. This loop filter 88 has a characteristic that is substantially equal to that of the loop filter 55 in FIG. 3 and the like. The multiplier 89 multiplies the output signal of the loop filter 88 by the constant −h, which determines the loop gain of the APC circuit, and converts it to the first angular frequency difference signal.

On the other hand, in the modulating section, the fourth reference angular frequency signal as the carrier angular frequency of the fourth carrier chrominance signal, which is the output signal of the fourth reference angular frequency signal generator 91, is integrated by the integrator 92, thereby obtaining a fifth phase signal. The adder 93 adds a phase signal of 90° to the fifth phase signal to derive a sixth phase signal. The phase amplitude converters 94 and 95 convert the fifth and sixth phase signals to the amplitude signals, so that first and second frequency converting signals for modulation are obtained. The modulator 96 comprises the multipliers 97 and 98 and adder 99, in which the first and second demodulation signals are multiplied by the first and second frequency converting signals for modulation each having a fourth reference angular frequency and having the phase difference of 90° with each other and thereafter these signals are added by the adder 99, and thereby obtaining the fourth carrier chrominance signal.

In the fifth embodiment, the phase comparator in the APC circuit can be commonly used to the APC circuit and the first demodulator by once demodulating the carrier chrominance signal. In addition, since the frequency band of the demodulation signal is as low as about 500 kHz, the sampling frequency for the digital signal process can be made low. Therefore, the scale of the overall chrominance signal processing circuit can be made small by concentrically arranging in this portion the comb filter, ACC (automatic chrominance gain controller), a filter of the narrowest band for frequency conversion, etc. which are necessary for the chrominance signal processing in the reproducing system of a VTR. An amplitude detection signal of the ACC can be accurately derived from the second demodulation signal. The phase difference signal, obtained from the first demodulation signal is also a signal proportional to the amplitude of the burst signal, which has an adverse effect in that it hinders accurate frequency conversion. However, a more accurate phase difference signal can be obtained by using the ACC and the amplitude detection signal obtained from the second demodulation signal to eliminate the influence of the amplitude component included in the burst signal portion of the first demodulation signal. On the other hand, the level of the burst signal is detected from the second demodulation signal, thereby making it possible to discriminate an input video signal to see if it is a color signal or a black and white signal.

Further, since the carrier angular frequencies differ in the respective cases of the NTSC, PAL and SECAM systems, the band of the filter has to be generally selectively changed to separate the respective different frequencies; however, according to this embodiment, this frequency separation is simplified and the accurate band limitation is performed as to the demodulation signal, so that most of the components can be commonly used.

Moreover, in this embodiment, two multipliers are needed as the modulator. However, the use of the angular frequency of $1/_2N$ (N is an integer) of the sampling angular frequency as the fourth reference angular frequency enables the multiplier and phase amplitude converter to be simplified. The frequency conversion of the carrier chrominance signal to the necessary angular frequency can be performed by a frequency converter having a single multiplier provided after this, so that the scales of the multiplier and phase-amplitude converter can be made small.

Figure 9:
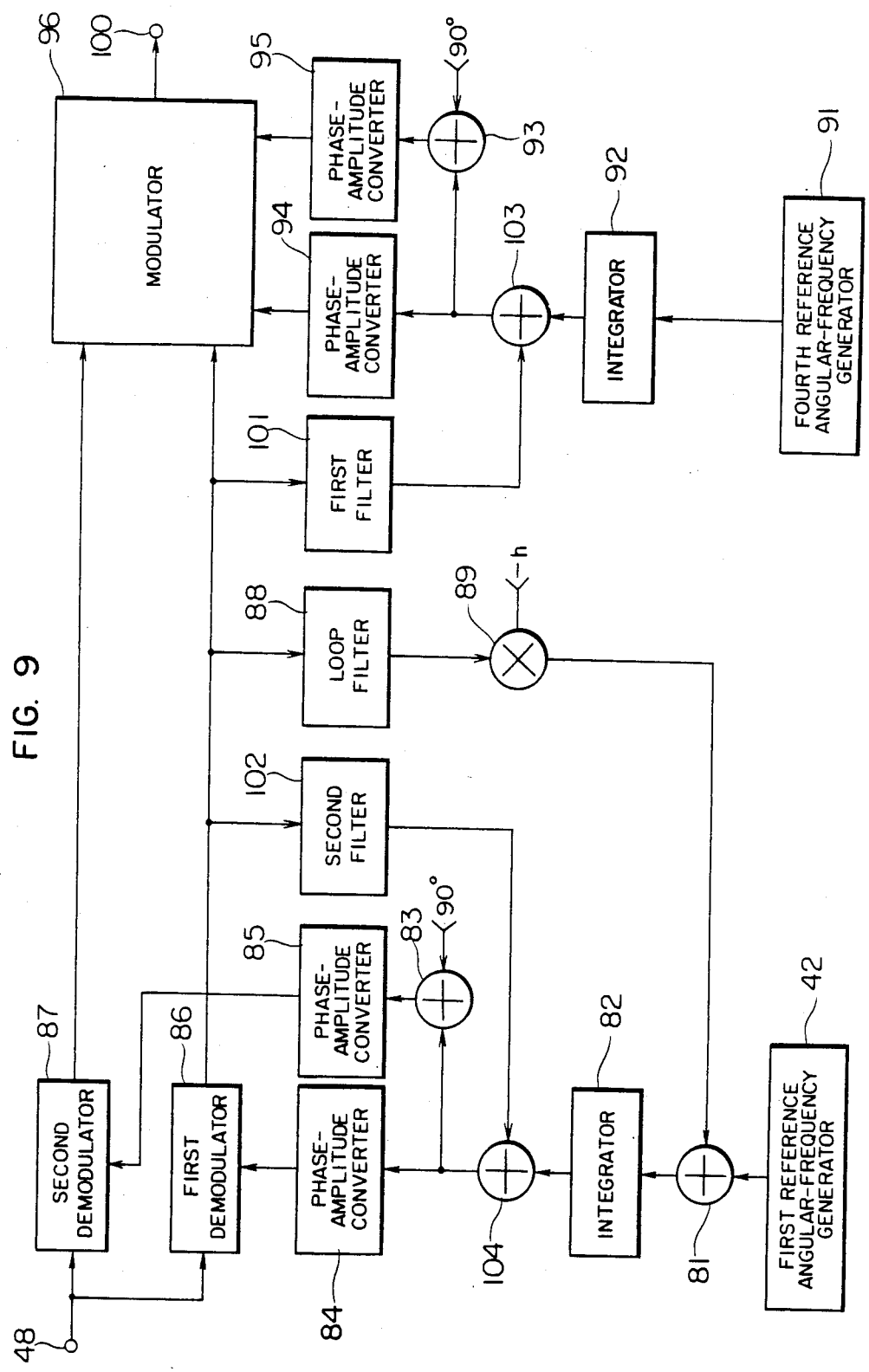
FIGS. 9 and 10 are block diagrams showing arangements of sixth and seventh embodiments of the invention, respectively.

Further embodiments of the invention are disclosed hereinafter. FIG. 9 shows a block diagram of the chrominance signal processing apparatus of the sixth embodiment of the present invention and shows that further means can be easily added to more accurately perform the frequency conversion performed by the fifth embodiment of FIG. 8. In FIG. 9, the first and second filters 101, 102, adders 103 and 104 are added to FIG. 8, whose operations are similar to those in the fourth embodiment of FIG. 7. The filters 102 and 102 are provided to take out the burst period of signal portion from the first demodulation signal, which are then converted to the first and second residual angular frequency difference signals to be added to the output signals of the integrators 92 and 82 by the adders 103 and 104. Thus the more accurate modulation, i.e., frequency conversion can be performed.

Figure 10:
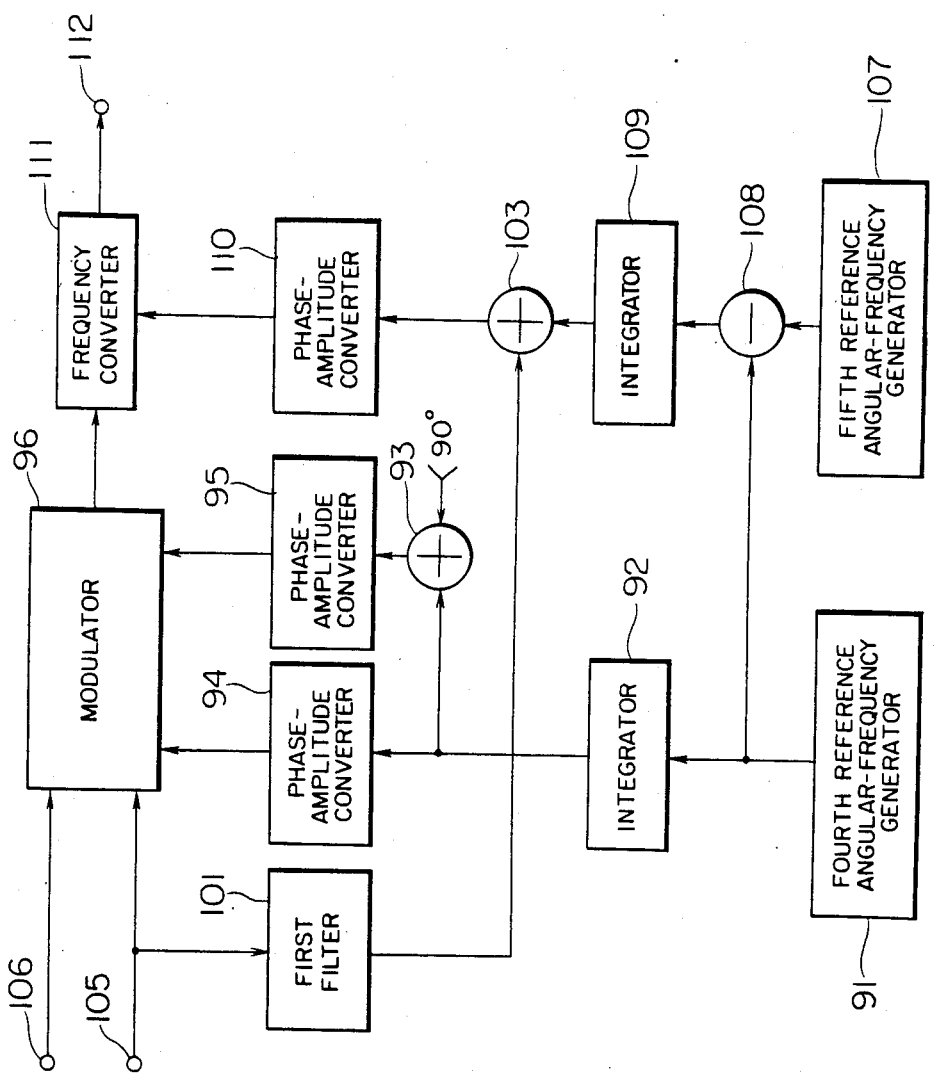

FIG. 10 shows a block diagram of the chrominance signal processing apparatus of the seventh embodiment of the present invention, and shows another means for further accurately performing the frequency conversion performed by the fifth embodiment of FIG. 8. In FIG. 10, the sixth frequency converter is provided in the post stage of the modulator shown in FIG. 8, 105, 106 designate output terminals of the first and second demodulation signals, 107 fifth reference angular frequency signal generator, 108 subtractor, 109 integrator, 110 phase-amplitude converter, 111 frequency converter, and 112 output terminal of fifth carrier chrominance signal. The first and second demodulation signals inputted from the terminals 105, 106 are modulated by the modulator 96, the difference signal between the fourth and fifth reference angular frequencies is obtained in the subtractor 108, integrated by the integrator 109 and converted to the amplitude signal by the phase-amplitude converter 110 to produce the frequency converting signal, which is used for the signal conversion into the fifth carrier chrominance signal by the frequency converter 111, which is outputted from the terminal 112. Similarly to the sixth embodiment of FIG. 9, the first residual angular frequency difference signal obtained from the first demodulation signal by the first filter 101 is added to the output signal of the integrator 109 by the adder 103 to eliminate remaining phase variations.

Among chrominance signal processing apparatuses, in addition to the foregoing frequency conversion, in order to eliminate the crosstalk from the adjacent tracks upon reproduction by a comb filter, there are the following methods (a) and (b) of processing the frequency converting signal when the frequency conversion is performed for the recording or reproducing operation.

(a) A method whereby the phase of the frequency converting signal is made constant for one horizontal scan interval and is periodically changed. For instance, the frequency of the frequency converting signal is set to $(f_{CH}+40f_H)$ and during one field interval in one frame, the phase is shifted to 90°, 180°, 270°, and 0° on a 90° unit basis for every one horizontal scan interval, and during the other field interval, the phase is shifted to 270°, 180°, 90°, and 0° on a -90° units basis for every one horizontal scan interval.

(b) A method whereby the frequency of the frequency converting signal is made constant for at least one field interval or one recording track interval and is also periodically changed. For example, the frequency of the frequency converting signal is shifted in such a way that $(f_{CH}+(44-\frac{1}{8})f_H)$ one field interval in one frame, while the frequency is shifted to $(f_{CH}+(44+\frac{1}{8})f_H)$ for the other field interval.

The present invention can be easily realized even for both of the foregoing methods (a) and (b). In other words, for the method (a), in the arrangement shown in FIG. 2, there may be adopted an arrangement such that a phase signal which is constant for at least one horizontal scan interval and also periodically varies is added to the output of the integrator 26 and is supplied as the input to the phase amplitude converter 30. As for the method (b), the first or second reference angular frequency signal generator 23 or 24 can be provided with a function to generate an angular frequency signal which is almost proportional to the frequency of the horizontal sync signal and is constant for at least one field interval or one recording track interval and also periodically varies. For instance, in FIG. 4, there may be adopted an arrangement such that a switch having two inputs and one output is arranged in place of the input of the constant k of the multiplier 68, and a constant $k_1$ is inputted by one of the two inputs and a constant $k_2$ is inputted by the other input and the switch is changed over for every field. For instance, $k_1=(44-\frac{1}{8})$ and $K_2=(44+\frac{1}{8})$. As another method, the invention can be also simply realized by a method whereby the difference in angular frequency for every field is added to the output of the adder 25 in FIG. 2 for every other field and is supplied as the input to the integrator 26.

In this way, an example of a VTR has been described in the above. However, the present invention is not limited to only the chrominance signal processing apparatus of the VTR, but can be also applied to other chrominance signal processing apparatus which frequency-converts the carrier chrominance signal, for example, a video disc player or the like.

As described above, the present invention relates to a chrominance signal processing apparatus for processing a sampled and digitized signal in which the first carrier chrominance signal is frequency-converted to the second carrier chrominance signal whose carrier angular frequency is the second reference angular frequency using the frequency converting signal. This invention provides an arrangement in which: the variation component of the carrier angular frequency from the first reference angular frequency signal which the first carrier chrominance signal has, namely, the angular frequency difference signal is obtained by the APC circuit; the process for obtaining the foregoing frequency converting signal is smplified by adding or subtracting the first and second reference angular frequency signals, angular frequency difference signal, and further the various kinds of angular frequency signals and phase signals which give necessary functions and performances as the chrominance signal processing circuit in the states of the angular frequency signal and phase signal; and the number of circuit elements and scale in case of realizing this by a digital circuit are reduced. In addition, the present invention enables the frequency variation which the first carrier chrominance signal has to be elminated in a wide frequency band due to its performance, thereby making it possible to perform the accurate frequency conversion.

We claim:

1. A chrominance signal processing apparatus for processing a sampled and digitized signal in a chrominance signal processing apparatus having first frequency converting means to which a first carrier chrominance signal is inputted and which frequency-converts said first carrier chrominance signal to a second carrier chrominance signal whose carrier angular frequency is substantially equal to a second reference angular frequency by use of a first frequency converting signal, said apparatus comprising:

means for obtaining a first angular frequency difference signal which is substantially equal to the difference between a carrier angular frequency signal of said first carrier chrominance signal and a first reference angular frequency signal;

first integrating means for obtaining a first phase signal by integrating a first angular frequency signal which is a sum or difference among said first reference angular frequency signal, said first angular frequency difference signal and a second reference angular frequency signal; and first phase-amplitude converting means for obtaining said first frequency converting signal by converting said first phase signal to an amplitude signal.

2. A chrominance signal processing apparatus according to claim 1, wherein said means for obtaining the first angular frequency difference signal comprises:

means for obtaining a phase difference signal by comparing the phase of a burst signal in said first carrier chrominance signal with the phase of a phase comparison signal;

means for converting said phase difference signal to the first angular frequency difference signal;

second integrating means for obtaining a second phase signal by integrating a second angular frequency signal which is a sum or difference between the first angular frequency difference signal and the first reference angular frequency signal; and second phase-amplitude converting means for obtaining said phase comparison signal by converting said second phase signal to an amplitude signal.

3. A chrominance signal processing apparatus according to claim 2, wherein said means for obtaining the first angular frequency difference signal comprises: means for adding a first residual phase difference signal which is derived by converting said phase difference signal to said first phase signal.

4. A chrominance signal processing apparatus according to claim 2, wherein said means for obtaining the first angular frequency difference signal comprises means for adding a second residual phase difference signal which is derived by converting said phase difference signal to said second phase signal.

5. A chrominance signal processing apparatus according to claim 1, wherein said means for obtaining the first angular frequency difference signal comprises:

means for obtaining a phase difference signal by comparing the phase of a burst signal in said second carrier chrominance signal with the phase of a phase comparison signal;

means for converting said phase difference signal to the first angular frequency difference signal;

second integrating means for obtaining a second phase signal by integrating said second angular frequency signal of a sum or difference between said first angular frequency difference signal and said second reference angular frequency signal; and second phase-amplitude converting means for obtaining said phase comparison signal by converting said second phase signal to an amplitude signal.

6. A chrominance signal processing apparatus according to claim 5, wherein said means for obtaining the first angular frequency difference signal comprises: means for adding a first residual phase difference signal which is derived by converting said phase difference signal to a phase signal of a frequency converting signal of a second frequency converting means which is arranged at the post stage of said first frequency converting means.

7. A chrominance signal processing apparatus according to claim 5, wherein said means for obtaining the first angular frequency difference signal comprises: means for adding a first residual phase difference signal which is derived by converting said phase difference signal to said second phase signal.

8. A chrominance signal processing apparatus for processing a sampled and digitized signal in a chrominance signal processing apparatus having first and second demodulating means to which a first carrier chrominance signal is inputted and which convert said first carrier chrominance signal to first and second demodulation signals by use of first and second frequency converting signals for demodulation which have a phase difference of 90° with respect to each other and modulating means to which first and second demodulation signal are inputted and which converts said first and second demodulation signals to a fourth carrier chrominance signal whose carrier angular frequency is substantially equal to a fourth reference angular frequency by use of third and fourth frequency converting signals for modulation which have a phase difference of 90° with each other, said apparatus comprising:

means for obtaining a first angular frequency difference signal from said first demodulation signal;

third integrating means for obtaining a third phase signal by integrating a third angular frequency signal which is a sum or difference between said first reference angular frequency signal and said first angular frequency difference signal;

means for obtaining a fourth phase signal by adding a phase signal of 90° to said third phase signal;

third and fourth phase-amplitude converting means for obtaining said first and second frequency converting signals for demodulation by converting said third and fourth phase signals to amplitude signals;

fourth integrating means for obtaining a fifth phase signal by integrating a fourth reference angular frequency signal;

means for obtaining a sixth phase signal by adding a phase signal of 90° to said fifth phase signal; and fifth and sixth phase amplitude converting means for obtaining said first and second frequency converting signals for modulation by converting said fifth and sixth phase signals to amplitude signals.

9. A chrominance signal processing apparatus according to claim 8, wherein said means for obtaining the first angular frequency difference signal comprises: means for adding a first residual phase difference signal which is derived by converting said phase difference signal to said third phase signal.

10. A chrominance signal processing apparatus according to claim 8, wherein said means for obtaining the first angular frequency difference signal comprises: means for adding a first residual phase difference signal which is derived by converting said phase difference signal to said fifth phase signal.

11. A chrominance signal processing apparatus according to claim 8, wherein said means for obtaining the first angular frequency difference signal comprises: means for adding a residual phase difference signal which is derived by converting said first demodulation signal to a phase signal of a frequency converting signal of a third frequency converting means which is arranged at the post stage of said modulating means.

* * * * *